United States Patent
Haruta et al.

(10) Patent No.: US 11,167,887 B2
(45) Date of Patent: Nov. 9, 2021

(54) AMORPHOUS COPOLYMERIZED POLYESTER RAW MATERIAL FOR FILM, HEAT-SHRINKABLE POLYESTER-BASED FILM, HEAT-SHRINKABLE LABEL, AND PACKAGED PRODUCT

(71) Applicant: TOYOBO CO., LTD., Osaka (JP)

(72) Inventors: Masayuki Haruta, Tsuruga (JP); Shintaro Ishimaru, Tsuruga (JP); Hideto Ohashi, Tsuruga (JP); Soichiro Minami, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 157 days.

(21) Appl. No.: 16/485,401

(22) PCT Filed: Feb. 6, 2018

(86) PCT No.: PCT/JP2018/003924
§ 371 (c)(1),
(2) Date: Aug. 12, 2019

(87) PCT Pub. No.: WO2018/147249
PCT Pub. Date: Aug. 16, 2018

(65) Prior Publication Data
US 2019/0375552 A1 Dec. 12, 2019

(30) Foreign Application Priority Data
Feb. 13, 2017 (JP) .............................. JP2017-024183

(51) Int. Cl.
| | |
|---|---|
| B65D 25/20 | (2006.01) |
| B65D 25/34 | (2006.01) |
| C08G 63/183 | (2006.01) |
| C08J 5/18 | (2006.01) |
| G09F 3/00 | (2006.01) |
| G09F 3/04 | (2006.01) |
| G09F 3/02 | (2006.01) |
| C08G 63/16 | (2006.01) |
| C08G 63/181 | (2006.01) |

(52) U.S. Cl.
CPC .......... B65D 25/205 (2013.01); B65D 25/34 (2013.01); C08G 63/183 (2013.01); C08J 5/18 (2013.01); G09F 3/0291 (2013.01); G09F 3/04 (2013.01); *B32B 2307/736* (2013.01); *B32B 2519/00* (2013.01); *C08G 63/16* (2013.01); *C08G 63/181* (2013.01); *C08J 2367/02* (2013.01); *G09F 3/00* (2013.01); *G09F 2003/0251* (2013.01); *G09F 2003/0272* (2013.01); *G09F 2003/0273* (2013.01); *Y10T 428/1328* (2015.01); *Y10T 428/1331* (2015.01)

(58) Field of Classification Search
None
See application file for complete search history.

(56) References Cited

U.S. PATENT DOCUMENTS

| | | | | |
|---|---|---|---|---|
| 4,963,418 | A * | 10/1990 | Isaka ..................... | B29C 61/003 156/218 |
| 4,985,538 | A * | 1/1991 | Fukuda ..................... | C08J 5/18 528/305 |
| 4,996,291 | A | 2/1991 | Yoshinaka et al. | |
| 5,070,180 | A * | 12/1991 | Fukuda ................. | C08G 63/16 528/272 |
| 9,080,027 | B2 * | 7/2015 | Haruta ...................... | C08J 5/18 |
| 10,287,433 | B2 * | 5/2019 | Haruta ................. | B29C 61/003 |
| 10,336,871 | B2 * | 7/2019 | Ishimaru ................ | C08G 63/60 |
| 11,084,901 | B2 * | 8/2021 | Minami ................ | C08G 63/183 |
| 2003/0088033 | A1 * | 5/2003 | Shelby ................. | B29C 61/003 525/444 |
| 2006/0057346 | A1 * | 3/2006 | Ito .............................. | C08J 5/18 428/220 |
| 2007/0104931 | A1 * | 5/2007 | Ito ........................ | B29C 61/003 428/220 |
| 2009/0270584 | A1 | 10/2009 | Endo et al. | |
| 2010/0279133 | A1 * | 11/2010 | Kamikage ................. | B32B 1/08 428/483 |

(Continued)

FOREIGN PATENT DOCUMENTS

| | | |
|---|---|---|
| JP | S64-004326 A | 1/1989 |
| JP | 02-289627 A * | 11/1990 |

(Continued)

OTHER PUBLICATIONS

"Film Coextrusion—A Troubleshooting Guide" (1994) (Year: 1994).*
European Patent Office, Extended European Search Report in European Patent Application No. 18750750.4 (dated Nov. 2, 2020).
Japanese Patent Office, International Search Report in International Patent Application No. PCT/JP2018/003924 (dated May 1, 2018).

*Primary Examiner* — Vivian Chen
(74) *Attorney, Agent, or Firm* — Leydig, Voit & Mayer, Ltd.

(57) ABSTRACT

The invention provides an amorphous copolymerized polyester raw material for a film. The raw material contains ethylene terephthalate as a main constituent component, and contains from 18% by mol to 30% by mol of neopentyl glycol when a total amount of a glycol component in a total polyester resin component is taken as 100% by mol. The raw material contains from 8% by mol to 16% by mol of a constituent unit derived from diethylene glycol in the total amount (100% by mol) of the glycol component in the total polyester resin component. The raw material has an intrinsic viscosity of from 0.70 dl/g to 0.86 dl/g. The raw material has a melt viscosity of 200 Pa·S or less, when measured at a shear rate of 6080/S at 250° C.

20 Claims, No Drawings

(56) References Cited

U.S. PATENT DOCUMENTS

| | | | | |
|---|---|---|---|---|
| 2011/0224369 | A1* | 9/2011 | Kim | C08J 5/18 |
| | | | | 524/605 |
| 2016/0090456 | A1* | 3/2016 | Ishimaru | C08G 63/183 |
| | | | | 428/131 |
| 2018/0229422 | A1* | 8/2018 | Inoue | B29C 61/06 |

FOREIGN PATENT DOCUMENTS

| | | | |
|---|---|---|---|
| JP | 03-068634 | A * | 3/1991 |
| JP | 04-164930 | A * | 6/1992 |
| JP | H05-033895 | B2 | 5/1993 |
| JP | 2004-058383 | A | 2/2004 |
| JP | 2004-175937 | A | 6/2004 |
| JP | 2007-079280 | A | 3/2007 |
| JP | 2007-083734 | A | 4/2007 |
| JP | 2007-152943 | A | 6/2007 |
| JP | 2007-196679 | A | 8/2007 |
| JP | 4411556 | B2 | 2/2010 |
| JP | 5249997 | B2 | 7/2013 |
| JP | 2015-199337 | A * | 11/2015 |
| JP | 2017-177677 | A | 10/2017 |
| WO | WO 2008/117842 | A1 | 10/2008 |
| WO | WO 2011/114934 | A * | 9/2011 |
| WO | WO 2014/185442 | A * | 11/2014 |
| WO | WO 2014/199787 | A * | 12/2014 |
| WO | WO 2016/083521 | A1 | 6/2016 |

* cited by examiner

US 11,167,887 B2

AMORPHOUS COPOLYMERIZED POLYESTER RAW MATERIAL FOR FILM, HEAT-SHRINKABLE POLYESTER-BASED FILM, HEAT-SHRINKABLE LABEL, AND PACKAGED PRODUCT

CROSS-REFERENCE TO RELATED APPLICATIONS

This patent application is the U.S. national phase of International Patent Application No. PCT/JP2018/003924, filed Feb. 6, 2018, which claims the benefit of Japanese Patent Application No. 2017-024183, filed Feb. 13, 2017, which are incorporated by reference in their entireties herein.

TECHNICAL FIELD OF THE INVENTION

The present invention relates to a heat-shrinkable polyester-based film suitable for a use as heat-shrinkable labels as well as a method for producing the same and also to a raw material for the film.

BACKGROUND ART

In a use as a label package, a cap seal, an assembling packaging, etc. acting both as a protector of glass bottles, plastic bottles or the like and as an indicator of products, a heat-shrinkable polyester-based film which exhibits high heat resistance, easy burning, and excellent solvent resistance has been widely used as a shrinking label in recent years. A use amount thereof tends to increase as a result of an increase in PET (polyethylene terephthalate) bottle containers, etc.

As a heat-shrinkable polyester-based film, a film which greatly shrinks in a widthwise direction has been widely utilized up to now. In addition, in order to make a finish after shrinking better, a film wherein a shrinking rate in a lengthwise direction which is a non-shrinking direction is adjusted to be minus (i.e., a film which stretches by heating) has been also known (Patent Document 1).

Regarding disadvantages of a heat-shrinkable film wherein the shrinking rate is adjusted to be high in order to deal with various containers, there are problems that a natural shrinking rate after being stored at an ordinary temperature (after an aging) becomes high (Patent Documents 2 and 3), and that a heat-shrinking rate in hot water measured at 70° C. lowers. In Patent Document 2, the natural shrinking rate is improved by adopting a production method wherein the film is subjected to a biaxial stretch, and to a strengthening by cooling after a biaxial orientation and a longitudinal stretch. However, there is no description in Patent Document 2 on the heat-shrinking rates in hot water measured at 70° C. before and after the aging. In Patent Document 3, although the natural shrinking rate has been improved, technical findings concerning the improvement in the natural shrinking are not disclosed. In addition, values of the shrinking rates at 70° C. before and after the aging are not disclosed. When a decrease in the shrinking rate at 70° C. is large, initial shrinking rates in conducting the shrinking are different before and after the aging whereby there is resulted a problem that a finish after shrinking becomes bad. Particularly, in a shrinking apparatus using a hot air having low heat transfer coefficient, there are resulted problems of an insufficient shrinking and a distortion of labels upon finishing if the initial shrinking rates by hot air are different before and after the aging.

PRIOR ART DOCUMENTS

Patent Documents

Patent Document 1: Japanese Patent Pregrant Publication (JP-B) No. 33895/93
Patent Document 2: Japanese Patent No. 4411556
Patent Document 3: Japanese Patent No. 5249997

DISCLOSURE OF THE INVENTION

Problem that the Invention is to Solve

A problem to be solved by the present invention is to provide a heat-shrinkable polyester film which exhibits a high heat-shrinking rate in a main shrinking direction, and which exhibits a small natural shrinking rate and small changes in the shrinking rate even if the film is subjected to an aging treatment. Another problem to be solved by the present invention is to provide a raw material for preparing the heat-shrinkable polyester film as such.

Means for Solving the Problem

The present invention by which the above problems are solved comprises the following constitutions.

1. An amorphous copolymerized polyester raw material for a film, characterized that, it satisfies the following requirements (1) to (4), and is used for producing a film:
(1) The raw material contains ethylene terephthalate as a main constituent component, and contains from 18% by mol to 30% by mol of neopentyl glycol when a total amount of a glycol component in a total polyester resin component is taken as 100% by mol;
(2) The raw material contains from 8% by mol to 16% by mol of a constituent unit derived from diethylene glycol in the total amount (100% by mol) of the glycol component in the total polyester resin component;
(3) The raw material has an intrinsic viscosity of from 0.70 dl/g to 0.86 dl/g; and
(4) The raw material has a melt viscosity of 200 Pa·S or less, when measured at a shear rate of 6080/S at 250° C.

2. The copolymerized polyester raw material for a film according to the above 1, wherein, when the raw material is made into a film of 40 μm thickness, a number of defect in 1 mm size or more in a lengthwise direction of the film or in a widthwise direction of the film is 1.5 or less on an average per 10 square meters of the film.

3. A heat-shrinkable polyester-based film, characterized in that, it contains the amorphous copolymerized polyester raw material mentioned in the above 1 or 2, and satisfies the following requirements (1) to (6):
(1) A heat-shrinking rate in hot water when the film is immersed for 10 seconds in hot water of 98° C. is from 60% to 85% in a main shrinking direction of the film;
(2) A heat-shrinking rate in hot water when the film is immersed for 10 seconds in hot water of 98° C. is from −5% to 10% in an orthogonal direction to the main shrinking direction of the film;
(3) A heat-shrinking rate in hot water when the film is immersed for 10 seconds in hot water of 70° C. is from 25% to 50% in the main shrinking direction of the film;
(4) A difference between a heat-shrinking rate in hot water when the film which has not been subjected to any aging treatment is immersed for 10 seconds in hot water of 70° C. and a heat-shrinking rate in hot water when the film which has been subjected to an aging treatment for 672 hours in an atmosphere of 40° C. temperature and 65% relative humidity is immersed for 10 seconds in hot water of 70° C. is from 0% to 5%;

(5) After the film has been subjected to the aging treatment for 672 hours in an atmosphere of 40° C. temperature and 65% relative humidity, a tensile elongation at break is 30% or more in the orthogonal direction to the main shrinking direction of the film; and (6) The intrinsic viscosity of the film is from 0.60 dl/g to 0.74 dl/g.

4. The heat-shrinkable polyester-based film according to the above 3, wherein, after the film has been subjected to the aging treatment for 672 hours in an atmosphere of 40° C. temperature and 65% relative humidity, a natural shrinking rate is from 0.1% to 0.6% in the main shrinking direction of the film.

5. The heat-shrinkable polyester-based film according to the above 3 or 4, wherein a maximum shrinking stress measured under a hot air of 90° C. is from 2 MPa to 8 MPa in the main shrinking direction of the film.

6. The heat-shrinkable polyester-based film according to any of the above 3 to 5, wherein an average unevenness in thickness is 20% or less per 1 m length both in the lengthwise direction of the film and in the widthwise direction of the film.

7. A heat-shrinkable label which is characterized in being prepared by using the heat-shrinkable polyester-based film mentioned in any of the above 3 to 6.

8. A packaged product which is characterized in being formed by coating the heat-shrinkable label according to the above 7 at least on a part of an outer periphery of a target to be packaged followed by subjecting to a heat-shrinking treatment.

Advantages of the Invention

The heat-shrinkable polyester-based film of the present invention exhibits not only a high shrinking rate but also a small decrease in the natural shrinking rate after the aging and in the shrinking rate measured at 70° C. Therefore, even after stored for a long period in a storehouse or the like, its size change in the main shrinking direction is small. Therefore, the film product exhibits good appearance because of little wrinkles, slacks, etc. As a result, troubles in processing steps such as a printing step can be decreased. In addition, a decrease in the shrinking rate at 70° C. before and after the aging is small in a step wherein the film is actually subjected to heat-shrinking after the printing step so as to form into a label. Therefore, regardless whether the used film is before the aging or after the aging, it is possible to achieve an industrially stable shrinking in a continued manner under the same shrinking condition.

In a film which is heat-shrinkable in a widthwise direction, its non-shrinking direction is a lengthwise direction of the film. Accordingly, a tension is applied in the lengthwise direction of the film upon the printing and processing. Therefore, a high tensile elongation at break is demanded in the lengthwise direction of the film. In the heat-shrinkable polyester-based film of the present invention, the tensile elongation at break in the non-shrinking direction after the aging is 20% or more. Accordingly, even after the aging, film breakage does not occur in the processing steps such as the printing step, and thus processing ability is excellent.

The raw material of the present invention exhibits a low melt viscosity even at a resin temperature of 250° C. Accordingly, it can be extruded at a lower temperature than an extrusion temperature adopted in conventional polyester raw materials. Accordingly, when the raw material is made into a film of 40 μm thickness, a number of the defects in 1 mm size or more in the lengthwise direction of the film or in the widthwise direction of the film can be made 1.5 or less on an average per 10 square meters of the film, in spite of the fact that the raw material contains much amount of diethylene glycol, specifically from 8% by mol to 16% by mol of the constituent unit derived from diethylene glycol in the total amount (100% by mol) of the glycol component.

The heat-shrinkable polyester-based film of the present invention exhibits not only the high shrinking rate but also a low shrinking stress. Therefore, it is suitably used even for containers having thin thickness. Accordingly, it is now possible to provide a heat-shrinkable film which can package targets in broader ranges than before.

The heat-shrinkable polyester-based film of the present invention encompasses not only a single-layered heat-shrinkable polyester film but also a laminated heat-shrinkable film prepared by laminating the heat-shrinkable polyester film layer of the present invention with a different resin layer.

A packaged product which is packaged with a label prepared from the heat-shrinkable polyester-based film of the present invention exhibits a beautiful appearance.

BEST MODE FOR CARRYING OUT THE INVENTION

Hereinafter, the heat-shrinkable polyester-based film of the present invention will be described in detail. As will be mentioned in detail later, a heat-shrinkable film is usually prepared by conveying and stretching a film by using a roll or the like. At that time, a conveying direction of the film is called a lengthwise direction and an orthogonal direction to the above lengthwise direction is called a widthwise direction of the film. Accordingly, the widthwise direction of the heat-shrinkable polyester-based film shown below is a direction which is vertical to an unwinding direction of the roll while the lengthwise direction of the film is a direction which is parallel to the unwinding direction the roll.

One of the means for preparing a more highly-shrinkable film is a means to increase an amount of a monomer component constituting the unit which can become an amorphous component in the film (hereinafter, it will be referred to just as an amorphous component). In a film prepared by a conventional transversely uniaxial stretch method, when the amount of the amorphous component is increased, the shrinking rate increases proportionally thereto. However, when the amount of the amorphous component is simply increased, it has been found that, although the high shrinking is possible thereby, there are resulted disadvantages such as that the natural shrinking rate increases and the shrinking rate measured at a low temperature of about 70° C. lowers after the aging. It has been also found that, when the amount of the amorphous component is increased, an unevenness in the thickness becomes worse and an appearance of the film product roll is deteriorated. Under such circumstances, the inventors have paid their attention to diethylene glycol (hereinafter, it will be also referred to just as "DEG").

When an amount of diethylene glycol increases, heat resistance becomes bad and discharge of foreign matters increases in a melt extrusion. Therefore, diethylene glycol has not been positively used up to now. However, the present inventors found that, when diethylene glycol is used as a constituent unit of a polyester resin, stretching stress upon stretch of a film lowers and, in addition, a decrease in the shrinking rate after the aging being measured at a low temperature of about 70° C. can be suppressed.

The amorphous copolymerized polyester used for producing the heat-shrinkable polyester-based film of the present invention contains an ethylene terephthalate unit as a main constituent component. The expression used herein "contains an ethylene terephthalate unit as a main constituent component" means that the unit occupies 50% by mol or more of the total constituent components. A content of the ethylene terephthalate unit is preferred to be 50% by mol or more, more preferred to be 60% by mol or more, and further preferred to be 70% by mol or more in 100% by mol of the constituent units of the polyester.

As to other dicarboxylic acid components constituting the polyester of the present invention other than terephthalic acid, there are exemplified an aromatic dicarboxylic acid such as isophthalic acid, orthophthalic acid and 2,6-naphthalene-dicarboxylic acid, an aliphatic dicarboxylic acid such as adipic acid, azelaic acid, sebacic acid and decanedicarboxylic acid and an alicyclic dicarboxylic acid such as 1,4-cyclohexanedicarboxylic acid. In the present invention, it is preferred that no dicarboxylic acid component other than terephthalic acid is contained therein.

Hereunder, an interpretation for a phrase "can become an amorphous component" mentioned above will be mentioned in detail.

In the present invention, an "amorphous polymer" specifically stands for a polymer which does not show endothermic peak by melting in a measurement using a DSC (differential scanning colorimeter). In the amorphous polymer, crystallization does not substantially proceed. Accordingly, the amorphous polymer cannot assume a crystalline state or, even if crystallized, its degree of crystallization is very low.

Further, in the present invention, a "crystalline polymer" stands for a polymer which is not the above "amorphous polymer". That is, the "crystalline polymer" stands for a polymer which shows endothermic peak by melting in the measurement using a DSC (differential scanning colorimeter). The crystalline polymer is such a one which can be crystallized when the polymer is heated, or which can become crystallized, or is crystallized already.

Generally speaking, when a polymer being in such a state wherein many monomer units are bonded satisfies various conditions such as that stereoregularity of the polymer is low, symmetry of the polymer is bad, side chain of the polymer is big, branching of the polymer is abundant, or intermolecular cohesive force among polymers is small, it becomes an amorphous polymer. However, depending upon an existing state, there may be a case wherein crystallization well proceeds to result in a crystalline polymer. For example, even if a polymer has a big side chain, when the polymer is constituted from a single monomer unit, there may be a case wherein crystallization well proceeds to result in a crystalline polymer. Therefore, even if a polymer is resulted from the same monomer unit, the polymer may become crystalline or amorphous. Accordingly, in the present invention, an expression "a unit derived from a monomer which can become an amorphous component" is used.

Here, an expression "a monomer unit" used in the present invention stands for a repeating unit constituting a polymer, which unit is derived from one polyhydric alcohol molecule and one polycarboxylic acid molecule.

When a monomer unit (an ethylene terephthalate unit) consisting of terephthalic acid and ethylene glycol is a main monomer unit constituting a polymer, there are exemplified a monomer unit consisting of isophthalic acid and ethylene glycol, a monomer unit consisting of terephthalic acid and neopentyl glycol, a monomer unit consisting of terephthalic acid and 1,4-cyclohexanedimethanol and a monomer unit consisting of isophthalic acid and butanediol, as the above unit derived from the monomer which can become the amorphous component.

It is preferred that tricarboxylic and higher polycarboxylic acid (such as trimellitic acid, pyromellitic acid and anhydride thereof) is not contained in the polyester. In a heat-shrinkable polyester film prepared by using the polyester containing such polycarboxylic acid, it is difficult to achieve necessary high shrinking rate.

As to a diol component other than the ethylene terephthalate unit constituting the polyester of the present invention, there are exemplified an aliphatic diol such as 1,3-propanediol, 2,2-diethyl-1,3-propanediol, 2-n-butyl-2-ethyl-1,3-propanediol, 2,2-isopropyl-1,3-propanediol, 2,2-di-n-butyl-1,3-propanediol, 1,4-butanediol, hexanediol, neopentyl glycol and hexanediol, an alicyclic diol such as 1,4-cyclohexanedimethanol and an aromatic diol such as bisphenol A.

It is necessary that the amorphous copolymerized polyester used for producing the heat-shrinkable polyester-based film of the present invention contains a constituent unit derived from diethylene glycol. A content of the constituent unit derived from diethylene glycol is preferred to be 8% by mol or more, more preferred to be 9% by mol or more, and further preferred to be 10% by mol or more in 100% by mol of the constituent unit of the polyester. An upper limit of the constituent unit derived from diethylene glycol is preferred to be 16% by mol or less, more preferred to be 15% by mol or less, and further preferred to be 14% by mol or less. The constituent unit derived from diethylene glycol is such a component which lowers a glass transition temperature of the polyester so as to increase the heat-shrinking rate of the heat-shrinkable polyester film in a low temperature region. When the constituent unit derived from diethylene glycol is contained in 8% by mol or more, the effect of the present invention (such as a lowering of the shrinking rate and a decrease in the shrinking stress measured at 70° C. after the aging) is enhanced. On the contrary, when the diethylene glycol component is contained in 16% by mol or more, an improving effect for the lowering of the shrinking rate measured at 70° C. after the aging is not so significant and, in addition, deteriorated products and defects in the film increase.

In the polyester of the present invention, a total amount of the amorphous components in 100% by mol of the polyhydric alcohol component and in 100% by mol of the polycarboxylic acid component (i.e., in 200% by mol in total) in a total polyester resin is 18% by mol or more, preferably 19% by mol or more, and more preferably 20% by mol or more. In addition, an upper limit of the total amount of the amorphous component is 30% by mol or less, preferably 29% by mol or less, and more preferably 28% by mol or less. When the amounts of the constituent unit derived from diethylene glycol and the amorphous component are set within the above ranges, a polyester is obtained wherein the glass transition temperature (Tg) is adjusted to 60 to 70° C. When the Tg is low, film molecules may move at an ordinary temperature whereby physical properties of the film may change. Accordingly, the Tg is preferred to be 61° C. or higher and more preferred to be 62° C. or higher. When the Tg is high, the heat-shrinking rate in hot water of 70° C. lowers. Accordingly, the Tg is preferred to be 69° C. or lower and more preferred to be 68° C. or lower.

It is preferred that the polyester does not contain a diol having not less than 8 carbons (such as octanediol) or a trihydric or higher polyhydric alcohol (such as trimethylolpropane, trimethylolethane, glycerol or diglycerol). In a heat-shrinkable polyester film prepared by using the polyester containing such diol or polyhydric alcohol, it is difficult to achieve necessary high shrinking rate. It is preferred that the polyester does not contain triethylene glycol and polyethylene glycol if at all possible. In the polyester of the present invention, the amorphous component in 100% by mol of the polyhydric alcohol component and in 100% by mol of the polycarboxylic acid component (i.e., in 200% by mol in total) in the total polyester resin is preferred to be copolymerized. As a result of the copolymerization, there is no anxiety of segregation of raw materials, and it is possible to prevent a change in physical properties of the film due to variations in compositions of the film raw material. Moreover, as a result of the copolymerization, an ester interchange proceeds whereby the amount of amorphous component increases. Accordingly, it is advantageous for increasing the shrinking rate in the main shrinking direction.

If necessary, various additives such as wax, antioxidant, antistatic agent, crystal nucleus agent, viscosity-reducing agent, heat stabilizer, pigment for coloration, coloration preventer or ultraviolet absorber may be added to the resin which forms the heat-shrinkable polyester film of the present invention.

It is preferred that fine particles which make a working property (slipping property) of the film better are added as a lubricant to the resin which forms the heat-shrinkable polyester film of the present invention. Although anything may be selected as the fine particles, examples of the inorganic fine particles include silica, alumina, titanium dioxide, calcium carbonate, kaolin and barium sulfate while examples of the organic fine particles include acrylic resin particles, melamine resin particles, silicone resin particles and cross-linking polystyrene particles. An average particle size of the fine particles may be appropriately selected upon necessity from a range of 0.05 to 3.0 μm (in case of being measured using a Coulter counter). For example, when the fine particles are silica, it is possible to adjust the average particle size of the fine particles to the above range in case a content thereof is 50 ppm to 3000 ppm. The content of silica is preferred to be 200 ppm or more, and more preferred to be 300 ppm or more. When the content of silica is too much, transparency is deteriorated. Therefore, in a film which requires transparency, the content of silica is preferred to be 2000 ppm or less and more preferred to be 1500 ppm or less.

As to a method of compounding the above particles with the resin which forms the heat-shrinkable polyester film, although it is possible, for example, to add them in any of stages of producing the polyester resin, it is preferred that the particles are added as a slurry being dispersed in ethylene glycol or the like in a stage of esterification or in a stage after completion of ester interchange and before starting polycondensation reaction followed by proceeding the polycondensation. It is also preferred to conduct it, for example, by a method wherein a slurry of the particles dispersed in ethylene glycol, water or the like is blended with the polyester resin raw materials by using a kneading extruder equipped with a vent or by a method wherein the dried particles and the polyester resin raw materials are blended by using a kneading extruder.

It is also possible that the heat-shrinkable polyester film of the present invention is subjected to a corona treatment, a coating treatment or a flame treatment for improving adhesive property of the film surface.

Now, characteristic properties of the amorphous copolymerized polyester raw material and of the heat-shrinkable polyester-based film according to the present invention will be described.

It is preferred that the amorphous copolymerized polyester raw material according to the present invention has an intrinsic viscosity of from 0.70 dl/g to 0.86 dl/g. When the raw material having the intrinsic viscosity within this range is combined with a melt extrusion condition which will be mentioned later, it is now possible to adjust the intrinsic viscosity of the heat-shrinkable polyester-based film within a range of from 0.60 dl/g to 0.74 dl/g. When the intrinsic viscosity of the heat-shrinkable polyester-based film is less than 0.60 dl/g, the tensile elongation at break in the lengthwise direction of the film after the aging becomes less than 5% whereby it is not preferred. The intrinsic viscosity of the heat-shrinkable polyester-based film is preferred to be 0.62 dl/g or more, and more preferred to be 0.64 dl/g or more. Incidentally, a demand is low for a heat-shrinkable polyester-based film which has the intrinsic viscosity of higher than 0.74 dl/g. This is why an upper limit of the intrinsic viscosity is set to be 0.74 dl/g.

It is preferred that the amorphous copolymerized polyester raw material according to the present invention has a melt viscosity of 200 Pa·S or less, when measured at a shear rate of 6080/S at 250° C. When the melt viscosity is high, extrusion becomes difficult unless a resin temperature is increased. In the raw material as in the present invention which contains diethylene glycol abundantly, foreign matters in a film and a sheet after extrusion become abundant when the resin temperature is high whereby it is not preferred. Accordingly, the resin temperature is preferred to be 245° C. or low and more preferred to be 240° C. or low. A lower limit of the resin temperature is a melting point of the raw material. However, the melting point is not clear in the raw material of the present invention and, at 210° C., melting takes place. Accordingly, 210° C. shall be made as the lower limit of the resin temperature.

Further, when the melt viscosity measured at 250° C. is 200 Pa·S or more, a load of a machine used for melt extrusion of the raw material becomes high and size of facilities becomes big whereby it is not preferred. The melt viscosity is preferred to be 190 Pa·S or less and more preferred to be 180 Pa·S or less.

Furthermore, when the melt viscosity is too low, shearing stress at a discharge part of the melted resin becomes low resulting in the unevenness in thickness whereby it is not preferred. The melt viscosity measured at 250° C. is preferred to be 100 Pa·S or more, and more preferred to be 110 Pa·S or more.

When the amorphous copolymerized polyester raw material of the present invention is made into the heat-shrinkable film of 40 μm thickness, if a number of defect in 1 mm size or more in the lengthwise direction of the film or in the widthwise direction of the film is more than 1.5 per 10 square meters of the film, a part of the defect (foreign substance) results in an omission of ink upon printing and an appearance of a label after printing is deteriorated whereby it is not preferred. The number of the defect in the lengthwise direction of the film or in the widthwise direction of the film is preferred to be 1 or less and more preferred to be 0.5 or less per 10 square meters of the film.

When the heat-shrinkable polyester-based film of the present invention is immersed for 10 seconds in hot water of 98° C. under an unloaded state for shrinkage and is then immediately immersed for 10 seconds in water of 25° C.±0.5° C. to stop the shrinkage, the heat-shrinking rate (i.e., a heat-shrinking rate in hot water of 98° C.) in the widthwise direction (in the main shrinking direction) of the film is from 60% to 85%, wherein the heat-shrinking rate is calculated by the following formula 1 from lengths before and after the shrinking.

Heat-shrinking rate={[(Length before shrinking)−(Length after shrinking)]/(Length before shrinking)}×100(%)   formula(1)

When the heat-shrinking rate in hot water at 98° C. in the main shrinking direction is less than 60%, it is impossible to deal with a demand for a highly shrinking film covering the whole container (so-called full label). Moreover, when the film is used as a label, strain, insufficient shrinking, wrinkle, slack, etc. may occur in the label after the heat-shrinking due to small shrinking amount. The heat-shrinking rate in hot water at 98° C. is preferred to be 63% or more, and more preferred to be 66% or more. Incidentally, a demand is low for a film which has the heat-shrinking rate in hot water of 98° C. in the main shrinking direction of more than 85%, an upper limit of the heat-shrinking rate in hot water is set to be 85%.

Further, in the heat-shrinkable polyester-based film of the present invention, the heat-shrinking rate in hot water of 98° C. in the direction being orthogonal to the main shrinking direction of the film (the lengthwise direction) being measured in the same manner as above is from −5% to 10%. When the heat-shrinking rate in hot water at 98° C. in the orthogonal direction to the main shrinking direction is less than −5%, a stretched length of the film by heating is too much and, in a use as a label for a container, no good shrunk appearance can be resulted whereby it is not preferred. On the contrary, when the heat-shrinking rate in hot water of 98° C. in the orthogonal direction to the main shrinking direction is more than 10%, the label after the heat-shrinking becomes short (i.e. a height of the label decreases) and the label area becomes small whereby it is not preferred as the full label. Also, strain is apt to occur in the label after the heat-shrinking whereby it is not preferred. An upper limit of the heat-shrinking rate in hot water of 98° C. in the orthogonal direction to the main shrinking direction is preferred to be 8% or less and more preferred to be 6% or less.

Incidentally, when the heat-shrinking rate in hot water of 98° C. in the orthogonal direction to the main shrinking direction is less than −5%, the height of a label after shrinking becomes high and, as a result, an excessive part is in a state of overabundance causing the winkles whereby a lower limit is set to be −5%.

In the heat-shrinkable polyester-based film of the present invention, it is preferred that the maximum shrinking stress measured under hot air of 90° C. is 2 MPa to 7 MPa in the main shrinking direction of the film and that a shrinking stress after 30 seconds from a start of the measurement of shrinking stress is from 60% to 100% of the maximum shrinking stress. Incidentally, measurement of the shrinking stress is carried out by the method mentioned in Examples.

When the maximum shrinking stress at 90° C. in the main shrinking direction of the film is more than 7 MPa, although there is no problem therein in a case of containers of PET bottles, crash by the shrinking stress occurs during the shrinking in a case of containers having a thin thickness whereby it is not preferred. The maximum shrinking stress at 90° C. is more preferred to be 6 MPa or less and further more preferred to be 5 MPa or less. When the maximum shrinking stress at 90° C. in the main shrinking direction of the film is less than 2 MPa, in a use as a label for a container, there are some cases wherein the label becomes loose and does not tightly adhere to the container whereby it is not preferred. The maximum shrinking stress at 90° C. is more preferred to be 2.5 MPa or more and further preferred to be 3 MPa or more.

When the heat-shrinkable polyester-based film of the present invention is immersed for 10 seconds in hot water of 70° C. under an unloaded state for shrinkage and is then immediately immersed for 10 seconds in water of 25° C.±0.5° C. to stop the shrinkage, the heat-shrinking rate (i.e., a heat-shrinking rate in hot water of 70° C.) in the widthwise direction (in the main shrinking direction) of the film is from 25% to 50%, wherein the heat-shrinking rate is calculated by the above formula 1 from lengths before and after the shrinking. When the heat-shrinking rate in hot water at 70° C. in the main shrinking direction is less than 25%, in a use as a label, strain, insufficient shrinking, wrinkle, slack, etc. may occur in the label after the heat-shrinking due to small shrinking amount when the label is shrunk with a device which uses a hot air as a heat source. The heat-shrinking rate in hot water at 70° C. is preferred to be 30% or more, and more preferred to be 35% or more. Incidentally, a demand is low for a film which has the heat-shrinking rate in hot water of 70° C. in the main shrinking direction of more than 50%, an upper limit of the heat-shrinking rate in hot water is set to be 50%.

In the heat-shrinkable polyester-based film of the present invention, it is preferred that the difference between a heat-shrinking rate in hot water when the film which has not been subjected to any aging treatment is immersed for 10 seconds in hot water of 70° C. and a heat-shrinking rate in hot water when the film which has been subjected to an aging treatment for 672 hours in an atmosphere of 40° C. temperature and 65% relative humidity is immersed for 10 seconds in hot water of 70° C. is from 0% to 5% (following formula (2)). When the difference in the shrinking rates in hot water of 70° C. before and after the aging is big, temperature conditions during the step wherein the film is shrunk into a label are different before and after the aging whereby it is not preferred. Particularly when the films before and after the aging are used in a mixed manner depending upon a stockpile state, appearances of the finish after shrinking are different if the heat-shrinking is conducted in an industrially continuous manner whereby it is not preferred. The difference in the shrinking rates in hot water is preferred to be 4% or less, and more preferred to be 3% or less. The most desirable outcome is that the difference in the heat-shrinking rates in hot water do not change before and after the aging. This is why the lower limit is set to be 0%.

Difference in shrinking rates=(Shrinking rate in hot water before aging)−(Shrinking rate in hot water after aging) (%)   formula (2)

In the heat-shrinkable polyester-based film of the present invention, it is preferred that, after the film has been subjected to the aging treatment for 672 hours in an atmosphere of 40° C. temperature and 65% relative humidity, a natural shrinking rate calculated by the following formula (3) is from 0.1% to 0.6% in the main shrinking direction of the film. When the natural shrinking rate in the main shrinking direction (in the widthwise direction of the film) is high, a width of a rolled product of the film decreases and the width does not match in the processing stage such as printing whereby it is not preferred. The natural shrinking rate is preferred to be 0.5% or less and more preferred to be 0.4% or less. Incidentally, although the natural shrinking rate is most preferred to be 0%, only to an extent of 0.1% could be actually achieved in the present invention whereby the lower limit is set to be 0.1%.

Natural shrinking rate={[(Length after aging)−(Length before aging)]/(Length before aging)}× 100(%)     formula (3)

In the heat-shrinkable polyester-based film of the present invention, it is preferred that, after the film has been subjected to the aging treatment for 672 hours in an atmosphere of 40° C. temperature and 65% relative humidity, a tensile elongation at break is 30% or more in the orthogonal direction (lengthwise direction) to the main shrinking direction of the film. When the tensile elongation at break is less than 5%, the film is torn due to a tension in the lengthwise direction being loaded upon the printing or processing of the rolled product whereby it is not preferred. The tensile elongation at break is preferred to be 40% or more, and more preferred to be 50% or more.

In the heat-shrinkable polyester-based film of the present invention, its unevenness in thickness shown by the formula 4 is preferred to be 20% or less per 1 m length both in the lengthwise direction of the film and the widthwise direction of the film. When the unevenness in thickness is more than 20%, wrinkles and an out-of-register due to meandering occur in the printing or processing the rolled product whereby it is not preferred. The unevenness in thickness is preferred to be 16% or less and more preferred to be 12% or less.

Unevenness in thickness={[(Maximum thickness)−(Minimum thickness)]/(Average thickness)}× 100(%)     formula (4)

In the heat-shrinkable polyester-based film of the present invention, its thickness is preferred to be from 10 μm to 50 μm although there is no particular limitation therefor. More preferred lower limit for the thickness is 15 μm.

The heat-shrinkable polyester-based film of the present invention can be prepared in such a manner that the above-mentioned polyester raw material is subjected to a melt extrusion using an extruder, and then the resulting non-stretched film is subjected to a biaxial stretching in the widthwise direction. Incidentally, the polyester can be prepared by polycondensation of the above-mentioned suitable dicarboxylic acid component and diol component by a known method. Usually, polyester in chips is used as a raw material for the film.

In subjecting the raw material resin to the melt extrusion, it is preferred that the polyester raw material is dried using a drier such as a hopper drier or a paddle drier or using a vacuum drier. After the polyester raw material is dried as such, it is melted at a temperature of 230 to 270° C. using the extruder and is extruded into a film. In conducting such extrusion, it is possible to adopt any of known methods such as a T die method or a tubular method.

When the melted resin in a sheet form after the extrusion is quickly cooled, a non-stretched film can be prepared. As to a method for quick cooling of the melted resin, there may adopted a method wherein the melted resin is cast onto a rotating drum from mouthpieces to quickly solidify whereupon a substantially non-orientated resin sheet is prepared.

(Lateral Stretching and Relax after the Lateral Stretching)

When the following methods (1) and (2) are adopted, properties of the copolymerized polyester of the present invention can be expressed more advantageously whereby it is preferred.

Control of Conditions for the Lateral Stretching

In the lateral stretching, the film is previously heated at a temperature of from (Tg+10° C.) to (Tg+25° C.) under such a state that both ends of the film in the widthwise direction are held by clips in a tenter. After that, it is preferred to stretch to an extent of from 3.5 times to 6 times in length in the widthwise direction together with cooling so as to decrease the temperature to a range from (Tg-5° C.) to (Tg+9° C.). As a result of stretching in the widthwise direction together with cooling, a value of stress ratio [(tensile stress upon final stretching)/(upper yield point stress)] of a stress-strain curve becomes high and it is now possible to decrease the unevenness in thickness in the widthwise direction. After the lateral stretching, it is preferred to subject the film to a heat treatment at a stretching temperature of from +1° C. to +10° C. When the heat treatment temperature is lower than the stretching temperature, a relaxation of a molecular orientation is insufficient and the natural shrinking rate becomes high whereby it is not preferred. When the heat treatment temperature is higher than (the stretching temperature+10° C.), the shrinking rate in the widthwise direction lowers whereby it is not preferred.

Relax in the Widthwise Direction after the Lateral Stretching

In the heat treatment step, it is preferred to relax to an extent of from 0% to 5% in the widthwise direction (0% is without relax) under such a state wherein both ends of the film in the widthwise direction are held by clips in a tenter. As a result of conducting the relax, the shrinking rate in the widthwise direction somewhat lowers but the molecular orientation is subjected to relaxation in the widthwise direction and it is now possible to lower the shrinking stress and the natural shrinking rate. In addition, as a result of conducting the heat treatment at a temperature higher than the stretch temperature in the final heat treatment step, the molecular orientation is subjected to relaxation and it is now possible to lower the shrinking stress and the natural shrinking rate.

The packaged product of the present invention is formed in such a manner that a label having perforations or notches prepared from the heat-shrinkable polyester film of the present invention is coated at least on a part of an outer periphery of a target to be packaged followed by subjecting to a heat-shrinking treatment. Examples of the target to be packaged include PET bottles for beverages; various kinds of bottles and cans; plastic containers for confectionery, lunch box, etc.; and boxes made of paper. It is common that, when the target to be packaged is coated by means of heat-shrinking of the label prepared by the heat-shrinkable polyester-based film, the label is subjected to heat-shrinking to an extent of about 5 to 70% and is closely adhered to the target to be packaged. Incidentally, the label for coating the target to be packaged may be either printed or unprinted.

With regard to a method for preparing a label from the heat-shrinkable polyester-based film of the present invention, there are a method wherein an organic solvent is applied to an area which is a bit inside from an end of one side of a rectangular film, the film is then immediately made round and the ends thereof are layered and adhered to make into a label, and a method wherein an organic solvent is applied to an area which is a bit inside from an end of one side of a wound film in a roll shape, the film is then immediately made round and the ends thereof are layered and adhered and the resulting tube-shaped one is cut into a label. As to the organic solvent for the adhesion, it is preferred to use a cyclic ether such as 1,3-dioxorane or tetrahydrofuran. Besides the above, it is also possible to use an aromatic hydrocarbon such as benzene, toluene, xylene or trimethylbenzene; a halogenated hydrocarbon such as methylene chloride or chloroform; a phenol compound such as phenol; and a mixture thereof.

EXAMPLES

The present invention will now be more specifically illustrated by way of Examples and Comparative Examples although the present invention is never limited to the embodiments of such Examples but may be appropriately modified within a scope of the gist of the present invention. Incidentally, a method for the evaluation of the film is shown below.

[Heat-Shrinking Rate (Heat-Shrinking Rate in Hot Water)]

A film was cut into squares each being in a size of 10 cm×10 cm to make a film sample. Then, the sample was immersed for 10 seconds under an unloaded state in hot water of (predetermined temperature)±0.5° C. for heat-shrinkage, and was then immediately immersed for 10 seconds in water of 25° C.±0.5° C. to stop the shrinkage. After the sample was taken out from water, sizes of the film in longitudinal and lateral directions were measured and the heat-shrinking rate was determined according to the following formula (1).

Heat-shrinking rate={[(Length before shrinking)−(Length after shrinking)]/(Length before shrinking)}×100(%)      formula (1)

[Difference in the Heat-Shrinking Rates Before and after the Aging]

The heat-shrinking rate in hot water of 70° C. was determined by the same method as in the above formula (1). After that, a film which has not yet been measured was aged for 672 hours in a chamber for environmental test wherein temperature was 40° C. and humidity was 65%. Then the heat-shrinking rate in hot water of 70° C. was determined similarly. Difference in the heat-shrinking rate was determined according to the following formula (2).

Difference in heat-shrinking rate=(Heat-shrinking rate in hot water before aging)−(Heat-shrinking rate in hot water after aging) (%)      formula (2)

[Natural Shrinking Rate]

Marker lines were drawn on a film so as to make a distance between them 200 mm. After that, the distance (mm) between the marker lines was read to 1 decimal place. After that, the film was aged for 672 hours in a chamber for environmental test wherein temperature was 40° C. and humidity was 65%. After that, the distance between the marker lines was read similarly. Natural shrinking rate was determined according to the following formula (3).

Natural shrinking rate={[(Length after aging)−(Length before aging)]/(Length before aging)}×100(%)      formula (3)

[Tensile Elongation at Break in the Lengthwise Direction after the Aging]

The film was aged for 672 hours in a chamber for environmental test wherein temperature was 40° C. and humidity was 65%. After that, a film sample in a rectangular shape was cut out so that the film sample has a length in the lengthwise direction of the film of 140 mm and a length in the orthogonal direction to the measurement direction (in the widthwise direction of the film) of 20 mm. Both ends of the film sample were held in such a manner that each one end was held to an extent of 20 mm by each chuck (a distance between the chucks: 100 mm) using a universal tensile tester "DSS-100" (manufactured by Shimadzu). A tensile test was conducted under conditions wherein environmental temperature was 23° C. and tensile velocity was 200 mm/min. An elongation upon a tensile break was adopted as the tensile elongation at break.

[Shrinking Stress]

A film sample in a rectangular shape having a length in the main shrinking direction (in the widthwise direction) of 200 mm and a width of 20 mm was cut out from a heat-shrinkable film. The shrinking stress of this sample was measured using a measuring machine for strength and elongation (Tesilon Universal Tester PTM-250; registered trade mark of Orientec) equipped with a heating furnace manufactured by Toyo Baldwin (current company name: Orientec). An inner space of the heating furnace of the measuring machine for strength and elongation was previously heated at 90° C. A distance between chucks for holding the film sample was made 100 mm. In attaching the sample to the chucks of the measuring machine for strength and elongation, ventilation to the heating furnace was once stopped and a door of the heating furnace was opened. Each 25 mm of both ends of the sample in 150 mm in the lengthwise direction was sandwiched between the chucks. The distance between the chucks was made 100 mm and fixation without loosening was done so that the lengthwise direction between the chucks and the lengthwise direction of the sample were identical and the sample became horizontal. After the sample was attached to the chucks, the door of the heating furnace was quickly closed and the ventilation was started again. A stage wherein the door of the heating furnace was closed and the ventilation was started again was adopted as a starting point for measuring the shrinking stress. The shrinking stress (MPa) after 30 seconds was determined.

[Unevenness in Thickness]

A film sample was cut out in a rectangular shape of 1 m in a direction to be measured and 40 mm in the widthwise direction. Thickness was continuously measured along the lengthwise direction of the sample film at a rate of 5 m/minute using a thickness meter of a continuously contacting type (manufactured by Micron Sokuteiki KK). The unevenness in thickness of the film was calculated by the following formula (4).

Unevenness in thickness={[(Maximum thickness)−(Minimum thickness)]/(Average thickness)}×100(%)      formula (4)

[Melt Viscosity]

Melt viscosity was measured in accordance with JIS K 7199 using Capirograph 1D PMD-C (manufactured by Toyo Seiki Seisakusho) under a condition wherein a resin temperature was 250° C. and a shear rate was 6080/S.

[Method of Counting the Defects]

A film sample was cut out in a size of 50 cm in the widthwise direction and 50 cm in the lengthwise direction. The film sample was placed on a desk-top film orientation viewer (manufactured by Unitika) and polarized light was applied thereto. After that, a number of defects in 1 mm size or more was counted using a loupe of 10 magnifications. Similarly, a number of defects in 1 mm size or more in 120 films (30 square meters) was counted. Then, an average of the number of the defects per 10 square meters of the film was determined using the following formula 5.

Average of number of defects=(Total number of defects)/3(number/10 square meters)      formula (5)

[Content of Amorphous Unit]

A heat-shrinkable film was scraped off using a razor's edge to conduct a sampling. About 5 mg of the sampled film was dissolved in 0.7 ml of a mixed solvent of heavy chloroform and trifluoroacetic acid (in a ratio of 9/1 by volume). An existing amount of the amorphous units (neopentyl glycol unit and cyclohexanedimethanol unit in the following examples) was calculated using 1H-NMR (UNITY 50 manufactured by Variant). The "% by mol" thereof (a sum of a rate of a polyol type amorphous unit when the polyol unit is taken as 100% by mol and a rate of a polycarboxylic acid type amorphous unit when the polycarboxylic acid unit is taken as 100% by mol) was determined. Product of the polymer amount (% by mass) in the film and the above % by mol was defined as the content (molar % by mass) of the amorphous unit.

[Tg (Glass Transition Point)]

A temperature of a non-stretched film (5 mg) was raised from −40° C. to 120° C. at a raising speed of 10° C. per minute, by using a differential scanning calorimeter (type: DSC220; manufactured by Seiko Electronic Industry). The glass transition point was determined from the resulting endothermic curve. Specifically, a temperature of a crossing point of an extended line of a base line being lower than the glass transition temperature to a tangent showing a maximum inclination in a transition part was defined as the glass transition temperature (Tg).

[Finish after Shrinking]

A heat-shrinkable film was previously subjected to a three-color printing by using inks in green, gold and white colors manufactured by Toyo Ink. Both ends of the printed film were adhered using dioxorane to prepare a cylindrical label (a label wherein the main shrinking direction of the heat-shrinkable film was oriented as a circumferential direction). The label was cut. A diameter of the label in the shrinking direction was 70 mm. After that, it was subjected to a heat-shrinking on a 500-ml PET bottle (a diameter of a trunk of the bottle: 62 mm; a minimum diameter of a neck of the bottle: 25 mm) using a steam tunnel (type: SH-1500-L; manufactured by Fuji Astec Inc.) with a passing time of 4 seconds and at a zone temperature of 90° C. whereupon the label was attached. In the attachment, such an adjustment was done that, on the neck, an area of 30 mm diameter of the bottle contacted one of the ends of the label. The finish after shrinking was evaluated by naked eyes. Criteria for evaluation were as follows.

[Strain by Shrinkage in Label]

As an evaluation of the finish after shrinking, a strain in a 360° direction of an upper area of the attached label was measured using a gage, and the maximum value of the strain was determined. Evaluation was done according to the following criteria.

○: Maximum strain was less than 2.0 mm.

x: Maximum strain was not less than 2.0 mm.

[Insufficient Shrinking of Label]

The above shrinking state of the label was evaluated according to the following criteria.

○: No slack was noted between the attached label and the container but they were shrunk.

x: Slack due to insufficient shrinking was noted between the label and the container.

[Wrinkles on Label]

State of the wrinkle occurrence was evaluated according to the following criteria under the same shrunk/strained conditions as those mentioned for the label.

○: A number of wrinkles in a size of 2 mm or more was 2 or less.

x: A number of wrinkles in a size of 2 mm or more was 3 or more.

<Preparation of Polyester Raw Materials>

Raw materials A to H were prepared by a known method wherein polycondensation was conducted via ester interchange using dimethyl terephthalate (DMT) and each of glycol components mentioned below.

Raw material A: Polyester consisting of 20% by mol of neopentyl glycol, 10% by mol of diethylene glycol, 65% by mol of ethylene glycol and terephthalic acid (Intrinsic viscosity: 0.71 dl/g; melt viscosity measured at a shear rate of 6080/S at 250° C.: 160 Pa·S)

Raw material B: Polyester consisting of 30% by mol of neopentyl glycol, 9% by mol of diethylene glycol, 61% by mol of ethylene glycol and terephthalic acid (Intrinsic viscosity: 0.71 dl/g; melt viscosity measured at a shear rate of 6080/S at 250° C.: 160 Pa·S)

Raw material C: Polyester consisting of 20% by mol of neopentyl glycol, 15% by mol of diethylene glycol, 65% by mol of ethylene glycol and terephthalic acid (Intrinsic viscosity: 0.71 dl/g; melt viscosity measured at a shear rate of 6080/S at 250° C.: 140 Pa·S)

Raw material D: Polyester consisting of 15% by mol of neopentyl glycol, 10% by mol of diethylene glycol, 75% by mol of ethylene glycol and terephthalic acid (Intrinsic viscosity: 0.71 dl/g; melt viscosity measured at a shear rate of 6080/S at 250° C.: 160 Pa·S)

Raw material E: Polyester consisting of 25% by mol of neopentyl glycol, 6% by mol of diethylene glycol, 69% by mol of ethylene glycol and terephthalic acid (Intrinsic viscosity: 0.71 dl/g; melt viscosity measured at a shear rate of 6080/S at 250° C.: 190 Pa·S)

Raw material F: Polyester consisting of 25% by mol of neopentyl glycol, 10% by mol of diethylene glycol, 65% by mol of ethylene glycol and terephthalic acid (Intrinsic viscosity: 0.82 dl/g; melt viscosity measured at a shear rate of 6080/S at 250° C.: 190 Pa·S)

Raw material G: Polyester consisting of 25% by mol of neopentyl glycol, 10% by mol of diethylene glycol, 65% by mol of ethylene glycol and terephthalic acid (Intrinsic viscosity: 0.65 dl/g; melt viscosity measured at a shear rate of 6080/S at 250° C.: 130 Pa·S)

Raw material H: Polyester consisting of 20% by mol of neopentyl glycol, 16% by mol of diethylene glycol, 64% by mol of ethylene glycol and terephthalic acid (Intrinsic viscosity: 0.65 dl/g; melt viscosity measured at a shear rate of 6080/S at 250° C.: 130 Pa·S)

Incidentally, in the preparation of the above polyesters, 600 ppm (to the polyester) of $SiO_2$ (Sicilia 266 manufactured by Fuji Sicia) was added as a lubricant.

In the Table, EG is ethylene glycol, DEG is diethylene glycol, and NPG is neopentyl glycol. Each of the polyesters was appropriately made into chips.

Compositions of the polyester raw materials used in Examples and Comparative Examples and resin compositions and preparation conditions in Examples and Comparative Examples are shown in Tables 1 and 2.

TABLE 1

|  | Dicarboxylic acid component (% by mol) | Polyhydric alcohol component (% by mol) | | | Adding amount of lubricant | Tg | Intrinsic viscosity | Melt viscosity |
|---|---|---|---|---|---|---|---|---|
|  | DMT | EG | DEG | NPG | (ppm) | (° C.) | (dl/g) | (Pa · S) |
| Raw material A | 100 | 65 | 10 | 25 | 600 | 70 | 0.71 | 160 |
| Raw material B | 100 | 61 | 9 | 30 | 600 | 70 | 0.71 | 160 |
| Raw material C | 100 | 65 | 15 | 20 | 600 | 68 | 0.71 | 140 |
| Raw material D | 100 | 75 | 10 | 15 | 600 | 70 | 0.71 | 160 |
| Raw material E | 100 | 69 | 6 | 25 | 600 | 72 | 0.71 | 190 |
| Raw material F | 100 | 65 | 10 | 25 | 600 | 70 | 0.82 | 190 |
| Raw material G | 100 | 65 | 10 | 25 | 600 | 70 | 0.65 | 130 |
| Raw material H | 100 | 64 | 16 | 20 | 600 | 67 | 0.65 | 130 |

TABLE 2

|  | Raw material used | Resin temperature in extruder (° C.) | preheating temperature (° C.) | Lateral stretching step | | temperature of heat treatment step (° C.) | relaxing rate (%) |
|---|---|---|---|---|---|---|---|
|  |  |  |  | stretch temperature (° C.) | stretch magnification |  |  |
| Example 1 | A | 250 | 90 | 73 | 5 | 74 | 5 |
| Example 2 | B | 250 | 90 | 73 | 5 | 74 | 5 |
| Example 3 | C | 250 | 90 | 73 | 5 | 74 | 5 |
| Example 4 | F | 250 | 90 | 73 | 5 | 74 | 5 |
| Example 5 | F | 270 | 90 | 73 | 5 | 74 | 5 |
| Example 6 | A | 250 | 90 | 73 | 5 | 74 | 0 |
| Example 7 | A | 250 | 90 | 73 | 5 | 80 | 5 |
| Example 8 | A | 220 | 90 | 73 | 5 | 74 | 5 |
| Comparative Example 1 | D | 250 | 90 | 73 | 5 | 74 | 5 |
| Comparative Example 2 | E | 250 | 90 | 73 | 5 | 74 | 5 |
| Comparative Example 3 | G | 250 | 90 | 73 | 5 | 74 | 5 |
| Comparative Example 4 | H | 250 | 90 | 80 | 4 | 85 | 0 |
| Comparative Example 5 | C | 290 | 90 | 73 | 5 | 74 | 5 |

Example 1

The raw material A was poured into an extruder. This resin was melted at 250° C., extruded from a T die, and wound around a rotating metal roll wherein a surface temperature was cooled down to 30° C. so as to quickly cool whereupon a non-stretched film having a thickness of 190 μm was prepared. A pulling out speed (a rotating speed of the metal roll) of the non-stretched film at that time was about 20 m/min. Tg of the non-stretched film was 70° C. The resulting non-stretched film was guided into a tenter, and preheated so that a surface temperature of the film became 90° C. After that, stretching to an extent of 5 times in a widthwise direction was done together with cooling so that the film surface temperature became 73° C. Then, relaxing to an extent of 5% in the widthwise direction thereof was done together with heating so that the film surface temperature became 74° C. After that, the film was cooled and both ends thereof were cut and removed so that a width of film became 500 mm, followed by winding up in a roll whereupon a uniaxially stretched film having a thickness of about 40 μm was continuously prepared in a predetermined length. Characteristics of the resulting film were evaluated according to the above-mentioned methods. Result of the evaluations is shown in Table 3. Changes in physical properties before and after the aging were small whereby the result was good.

Example 2

A film having a thickness of 40 μm was prepared by the same method as in Example 1, except that the raw material A was changed to the raw material B. Result of the evaluation is shown in Table 3. The result was good as same as in Example 1.

Example 3

A film having a thickness of 40 μm was prepared by the same method as in Example 1, except that the raw material A was changed to the raw material C. Result of the evaluation is shown in Table 3. The result was good as same as in Example 1.

Example 4

A film having a thickness of 40 μm was prepared by the same method as in Example 1, except that the raw material A was changed to the raw material F. Result of the evaluation is shown in Table 3. The result was good as same as in Example 1.

Example 5

A film having a thickness of 40 μm was prepared by the same method as in Example 4, except that a discharging temperature of the extruder was changed from 250° C. to 270° C. Result of the evaluation is shown in Table 3. Although the intrinsic viscosity was lower than in Example 4, the result was good as same as in Example 1.

Example 6

A film having a thickness of 40 μm was prepared by the same method as in Example 1, except that the thickness of a non-stretched film was changed from 190 μm to 200 μm and that the relaxing rate in the heat treatment step in the tenter was changed from 5% to 0%. Result of the evaluation is shown in Table 3. Although the shrinking rate and the shrinking stress became higher than those in Example 1, the result was good as same as in Example 1.

Example 7

A film having a thickness of 40 μm was prepared by the same method as in Example 1, except that a temperature of the heat treatment step in the tenter was changed from 74° C. to 80° C. Result of the evaluation is shown in Table 3. Although the shrinking rate and the shrinking stress became lower than in Example 1, the result was good as same as in Example 1.

Example 8

A film having a thickness of 40 μm was prepared by the same method as in Example 1, except that a discharging temperature of the extruder was changed from 250° C. to 220° C. Result of the evaluation is shown in Table 3. The intrinsic viscosity became higher than that in Example 1 and a number of the defects decreased whereby the result was good.

Comparative Example 1

A film having a thickness of 40 μm was prepared by the same method as in Example 1, except that the raw material A was changed to the raw material D. Result of the evaluation is shown in Table 3. As compared with Example 1, the shrinking rate at 70° C. in the widthwise direction was low, the shrinking stress was high and the finish after shrinking was inferior.

Comparative Example 2

A film having a thickness of 40 μm was prepared by the same method as in Example 1, except that the raw material A was changed to the raw material E. Result of the evaluation is shown in Table 3. As compared with Example 1, although the finish after shrinking was good for the film before the aging, the shrinking rate at 70° C. in the widthwise direction was low for the film after the aging (i.e. a decrease by the aging was large), the shrinking stress was high and the finish after shrinking was inferior.

Comparative Example 3

A film having a thickness of 40 μm was prepared by the same method as in Example 1, except that the raw material A was changed to the raw material G. Result of the evaluation is shown in Table 3. As compared with Example 1, the finish after shrinking was in the same degree. However, the tensile elongation at break in the lengthwise direction (in the non-shrinking direction) was low for the film after the aging and, in the printing operation, breakage and tearing of the film occurred frequently.

Comparative Example 4

The raw material A was changed to the raw material H, and a non-stretched film having a thickness of 160 μm was prepared. A pulling out speed (a rotating speed of the metal roll) of the non-stretched film at that time was about 20 m/min. Tg of the non-stretched film was 67° C. The resulting non-stretched film was guided into a tenter, and preheated so that a surface temperature of the film became 90° C. After that, stretching to an extent of 4 times in a widthwise direction was done together with cooling so that the film surface temperature became 80° C. Then, the film was heated so that the film surface temperature became 85° C. After that, the film was cooled and both ends thereof were cut and removed so that a width of film became 500 mm, followed by winding up in a roll whereupon a uniaxially stretched film having a thickness of about 40 μm was continuously prepared in a predetermined length. Characteristics of the resulting film were evaluated according to the above-mentioned methods. Result of the evaluations is shown in Table 3. The finish after shrinking was in the same degree. However, the tensile elongation at break in the lengthwise direction (in the non-shrinking direction) was low for the film after the aging and, in the printing operation, breakage and tearing of the film occurred frequently.

Comparative Example 5

A film having a thickness of 40 μm was prepared by the same method as in Example 3, except that a discharging temperature of the extruder was changed from 250° C. to 290° C. Result of the evaluation is shown in Table 3. As compared with Example 3, the finish after shrinking was in the same degree. However, a number of defects in the film increased and omissions in the printing occurred frequently.

TABLE 3

| | | | Before aging | | | | | |
| | | | shrinking rate (%) | | | | | |
| | film intrinsic viscosity (dl/g) | thickness (μm) | at 70° C. in lengthwise direction | at 70° C. in widthwise direction | at 98° C. in lengthwise direction | at 98° C. in widthwise direction | tensile elongation at break (%) | shrinking stress (MPa) |
|---|---|---|---|---|---|---|---|---|
| Example 1 | 0.64 | 40 | −3 | 33 | 2 | 71 | 610 | 4.4 |
| Example 2 | 0.64 | 40 | −4 | 37 | 1 | 73 | 640 | 3.8 |
| Example 3 | 0.62 | 40 | −4 | 34 | 1 | 71 | 670 | 2.9 |
| Example 4 | 0.74 | 40 | −2 | 35 | 2 | 72 | 720 | 4.7 |
| Example 5 | 0.63 | 40 | −3 | 32 | 2 | 70 | 590 | 4.2 |

TABLE 3-continued

| | | | | | | | | |
|---|---|---|---|---|---|---|---|---|
| Example 6 | 0.64 | 40 | −3 | 34 | 2 | 76 | 580 | 4.7 |
| Example 7 | 0.64 | 40 | −3 | 26 | 2 | 64 | 450 | 3 |
| Example 8 | 0.69 | 40 | −2 | 35 | 3 | 73 | 650 | 4.7 |
| Comparative Example 1 | 0.64 | 40 | −1 | 24 | 6 | 61 | 600 | 8.2 |
| Comparative Example 2 | 0.65 | 40 | 0 | 29 | 4 | 70 | 660 | 5.8 |
| Comparative Example 3 | 0.58 | 40 | −4 | 30 | 1 | 70 | 500 | 4 |
| Comparative Example 4 | 0.58 | 40 | −5 | 30 | −2 | 68 | 450 | 3 |
| Comparative Example 5 | 0.58 | 40 | −5 | 30 | −1 | 69 | 590 | 2.5 |

| | Before aging | | | | | |
|---|---|---|---|---|---|---|
| | unevenness in thickness in lengthwise direction (%) | unevenness in thickness in widthwise direction (%) | strain by shrinkage in label | insufficient shrinking of label | wrinkles on label | number of defects in 1 mm size or more (number/10 m²) |
| Example 1 | 5 | 5 | o | o | o | 0.3 |
| Example 2 | 5 | 5 | o | o | o | 0.3 |
| Example 3 | 6 | 5 | o | o | o | 0.7 |
| Example 4 | 5 | 4 | o | o | o | 0.3 |
| Example 5 | 5 | 5 | o | o | o | 1 |
| Example 6 | 5 | 4 | o | o | o | 0.3 |
| Example 7 | 5 | 5 | o | o | o | 0.3 |
| Example 8 | 5 | 5 | o | o | o | 0 |
| Comparative Example 1 | 4 | 4 | x | o | x | 0.3 |
| Comparative Example 2 | 4 | 4 | o | o | o | 0 |
| Comparative Example 3 | 7 | 8 | o | o | o | 0.3 |
| Comparative Example 4 | 7 | 8 | o | o | o | 1 |
| Comparative Example 5 | 7 | 8 | o | o | o | 2 |

| | After aging | | | | | | | | |
|---|---|---|---|---|---|---|---|---|---|
| | shrinking rate (%) | | | | tensile elongation at break (%) | natural shrinking rate (%) | strain by shrinkage in label | insufficient shrinking of label | wrinkles on label |
| | at 70° C. in lengthwise direction | at 70° C. in widthwise direction | at 98° C. in lengthwise direction | at 98° C. in widthwise direction | | | | | |
| Example 1 | −3 | 31 | 2 | 71 | 55 | 0.3 | o | o | o |
| Example 2 | −4 | 34 | 1 | 73 | 48 | 0.4 | o | o | o |
| Example 3 | −4 | 33 | 1 | 71 | 85 | 0.1 | o | o | o |
| Example 4 | −2 | 34 | 2 | 72 | 85 | 0.2 | o | o | o |
| Example 5 | −3 | 30 | 2 | 70 | 45 | 0.3 | o | o | o |
| Example 6 | −3 | 31 | 2 | 76 | 45 | 0.4 | o | o | o |
| Example 7 | −3 | 25 | 2 | 64 | 45 | 0.2 | o | o | o |
| Example 8 | −2 | 34 | 3 | 73 | 75 | 0.4 | o | o | o |
| Comparative Example 1 | −1 | 23 | 6 | 61 | 60 | 0.2 | x | o | x |
| Comparative Example 2 | 0 | 15 | 4 | 70 | 40 | 0.6 | x | x | x |
| Comparative Example 3 | −4 | 27 | 1 | 70 | 15 | 0.4 | o | o | o |
| Comparative Example 4 | −5 | 29 | −2 | 68 | 20 | 0.3 | o | o | o |
| Comparative Example 5 | −5 | 30 | −1 | 69 | 20 | 0.3 | o | o | o |

| | Difference before and after aging shrinking rate (%) | | | |
|---|---|---|---|---|
| | at 70° C. in lengthwise direction | at 70° C. in widthwise direction | at 98° C. in lengthwise direction | at 98° C. in widthwise direction |
| Example 1 | 0 | 2 | 0 | 0 |
| Example 2 | 0 | 3 | 0 | 0 |
| Example 3 | 0 | 1 | 0 | 0 |
| Example 4 | 0 | 1 | 0 | 0 |
| Example 5 | 0 | 2 | 0 | 0 |
| Example 6 | 0 | 3 | 0 | 0 |

TABLE 3-continued

| | | | | |
|---|---|---|---|---|
| Example 7 | 0 | 1 | 0 | 0 |
| Example 8 | 0 | 1 | 0 | 0 |
| Comparative Example 1 | 0 | 1 | 0 | 0 |
| Comparative Example 2 | 0 | 14 | 0 | 0 |
| Comparative Example 3 | 0 | 3 | 0 | 0 |
| Comparative Example 4 | 0 | 1 | 0 | 0 |
| Comparative Example 5 | 0 | 0 | 0 | 0 |

INDUSTRIAL APPLICABILITY

In the heat-shrinkable polyester-based film of the present invention, a decrease in the heat-shrinking rate after the aging is small and the tensile elongation at break in the non-shrinking direction after the aging is high, in spite of the fact of having the high heat-shrinking rate. Accordingly, it can be advantageously used as a label. The packaged product such as a container wherein the heat-shrinkable polyester-based film of the present invention is used as a label exhibits a beautiful appearance. In addition, the amorphous copolymerized polyester raw material for a film in accordance with the present invention can be advantageously used for producing the heat-shrinkable polyester-based film.

The invention claimed is:

1. A heat-shrinkable polyester-based film comprising an amorphous copolymerized polyester raw material that satisfies the following requirements (1) to (4):
   (1) the raw material contains ethylene terephthalate as a main constituent component, and contains from 18% by mol to 30% by mol of neopentyl glycol when a total amount of a glycol component in a total polyester resin component is taken as 100% by mol;
   (2) the raw material contains from 8% by mol to 16% by mol of a constituent unit derived from diethylene glycol in the total amount (100% by mol) of the glycol component in the total polyester resin component;
   (3) the raw material has an intrinsic viscosity of from 0.70 dl/g to 0.86 dl/g; and
   (4) the raw material has a melt viscosity of 200 Pa·S or less, when measured at a shear rate of 6080/S at 250° C.;
wherein the film satisfies the following requirements (5) to (10):
   (5) a heat-shrinking rate in hot water when the film is immersed for 10 seconds in hot water of 98° C. is from 60% to 85% in a main shrinking direction of the film;
   (6) a heat-shrinking rate in hot water when the film is immersed for 10 seconds in hot water of 98° C. is from −5% to 10% in an orthogonal direction to the main shrinking direction of the film;
   (7) a heat-shrinking rate in hot water when the film is immersed for 10 seconds in hot water of 70° C. is from 25% to 50% in the main shrinking direction of the film;
   (8) a difference between a heat-shrinking rate in hot water when the film which has not been subjected to any aging treatment is immersed for 10 seconds in hot water of 70° C. and a heat-shrinking rate in hot water when the film which has been subjected to an aging treatment for 672 hours in an atmosphere of 40° C. temperature and 65% relative humidity is immersed for 10 seconds in hot water of 70° C. is from 0% to 5%;
   (9) after the film has been subjected to the aging treatment for 672 hours in an atmosphere of 40° C. temperature and 65% relative humidity, a tensile elongation at break is 30% or more in the orthogonal direction to the main shrinking direction of the film; and
   (10) the intrinsic viscosity of the film is from 0.60 dl/g to 0.74 dl/g.

2. A heat-shrinkable label comprising the heat-shrinkable polyester-based film according to claim 1.

3. A packaged product formed by coating the heat-shrinkable label according to claim 2 at least on a part of an outer periphery of a target to be packaged followed by subjecting to a heat-shrinking treatment.

4. The heat-shrinkable polyester-based film according to claim 1, wherein, when the raw material is made into a film of 40 μm thickness, a number of defect in 1 mm size or more in a lengthwise direction of the film or in a widthwise direction of the film is 1.5 or less on an average per 10 square meters of the film.

5. A heat-shrinkable label comprising the heat-shrinkable polyester-based film according to claim 4.

6. A packaged product formed by coating the heat-shrinkable label according to claim 5 at least on a part of an outer periphery of a target to be packaged followed by subjecting to a heat-shrinking treatment.

7. The heat-shrinkable polyester-based film according to claim 4, wherein, after the film has been subjected to the aging treatment for 672 hours in an atmosphere of 40° C. temperature and 65% relative humidity, a natural shrinking rate is from 0.1% to 0.6% in the main shrinking direction of the film.

8. The heat-shrinkable polyester-based film according to claim 7, wherein a maximum shrinking stress measured under a hot air of 90° C. is from 2 MPa to 8 MPa in the main shrinking direction of the film.

9. The heat-shrinkable polyester-based film according to claim 8, wherein an average unevenness in thickness is 20% or less per 1 m length both in the lengthwise direction of the film and in the widthwise direction of the film.

10. A heat-shrinkable label comprising the heat-shrinkable polyester-based film according to claim 9.

11. A packaged product formed by coating the heat-shrinkable label according to claim 10 at least on a part of an outer periphery of a target to be packaged followed by subjecting to a heat-shrinking treatment.

12. The heat-shrinkable polyester-based film according to claim 1, wherein, after the film has been subjected to the aging treatment for 672 hours in an atmosphere of 40° C. temperature and 65% relative humidity, a natural shrinking rate is from 0.1% to 0.6% in the main shrinking direction of the film.

13. A heat-shrinkable label comprising the heat-shrinkable polyester-based film according to claim 12.

14. A packaged product formed by coating the heat-shrinkable label according to claim 13 at least on a part of an outer periphery of a target to be packaged followed by subjecting to a heat-shrinking treatment.

15. The heat-shrinkable polyester-based film according to claim 1, wherein a maximum shrinking stress measured under a hot air of 90° C. is from 2 MPa to 8 MPa in the main shrinking direction of the film.

16. A heat-shrinkable label comprising the heat-shrinkable polyester-based film according to claim 15.

17. A packaged product formed by coating the heat-shrinkable label according to claim 16 at least on a part of an outer periphery of a target to be packaged followed by subjecting to a heat-shrinking treatment.

18. The heat-shrinkable polyester-based film according to claim 1, wherein an average unevenness in thickness is 20% or less per 1 m length both in the lengthwise direction of the film and in the widthwise direction of the film.

19. A heat-shrinkable label comprising the heat-shrinkable polyester-based film according to claim 18.

20. A packaged product formed by coating the heat-shrinkable label according to claim 17 at least on a part of an outer periphery of a target to be packaged followed by subjecting to a heat-shrinking treatment.

* * * * *